United States Patent [19]

Ohmura et al.

[11] Patent Number: 4,855,774
[45] Date of Patent: Aug. 8, 1989

[54] LENS-FITTED PHOTOGRAPHIC FILM PACKAGE

[75] Inventors: Hiroshi Ohmura; Seimei Ushiro; Hiroshi Hara, all of Tokyo; Seiji Asano, Saitama; Toshio Yoshida, Ibaragi, all of Japan

[73] Assignee: Fuji Photo Film Co., Ltd., Kanagawa, Japan

[21] Appl. No.: 127,286

[22] Filed: Dec. 1, 1987

[30] Foreign Application Priority Data

Dec. 1, 1986 [JP] Japan ............................ 61-185230[U]
Feb. 10, 1987 [JP] Japan .............................. 62-19279[U]

[51] Int. Cl.⁴ ....................... G03B 17/00; G03B 17/02
[52] U.S. Cl. ...................................... 354/203; 354/288
[58] Field of Search ................ 354/202, 203, 275, 288

[56] References Cited

U.S. PATENT DOCUMENTS

| | | | |
|---|---|---|---|
| 2,557,297 | 6/1951 | Lea | 354/288 X |
| 3,282,181 | 11/1966 | Lange | 354/203 |
| 3,413,903 | 12/1968 | Maldarelli | 354/203 |
| 3,482,681 | 12/1969 | Nerwin et al. | 354/275 |
| 3,650,194 | 3/1972 | Ib | 354/275 X |
| 3,918,075 | 11/1975 | Horn et al. | 354/275 X |
| 4,329,037 | 5/1982 | Caviness | 354/288 X |
| 4,365,877 | 12/1982 | Shaw | 352/184 |
| 4,601,562 | 7/1986 | Yoneyama et al. | 354/288 X |
| 4,685,790 | 8/1987 | Uematsu | 354/203 |

FOREIGN PATENT DOCUMENTS

| | | |
|---|---|---|
| 1694013 | 3/1956 | Fed. Rep. of Germany . |
| 1975027 | 12/1967 | Fed. Rep. of Germany . |
| 3102908 | 10/1982 | Fed. Rep. of Germany . |
| 3735116 | 4/1988 | Fed. Rep. of Germany . |
| 3740572 | 6/1988 | Fed. Rep. of Germany . |
| 6708486 | 3/1968 | Netherlands ........................ 354/288 |
| 430648 | 6/1935 | United Kingdom . |
| 445907 | 4/1936 | United Kingdom . |
| 453817 | 9/1936 | United Kingdom . |
| 558516 | 1/1944 | United Kingdom ................ 354/288 |
| 1060937 | 3/1967 | United Kingdom ................ 354/288 |
| 1256490 | 12/1971 | United Kingdom . |
| 1462353 | 1/1977 | United Kingdom . |
| 2130387 | 5/1982 | United Kingdom . |
| 2093200 | 8/1982 | United Kingdom . |

Primary Examiner—Donald A. Griffin
Attorney, Agent, or Firm—Young & Thompson

[57] ABSTRACT

A lens-fitted photographic film package includes a light-tight film case with a taking lens fitted thereto, an empty film container enclosed in the light-tight film case, and a rolled film with its one end retained in the empty film container enclosed in the light-tight film case. The light-tight film case consists of two sections one of which is formed with members for preventing the light-tight film case from being deformed by an external force. These members can be spaced horizontal parallel ribs cast into the plastic of the one film case section. Or those members can be a tongue on one section insertable in a bayonet slot in the other section.

17 Claims, 4 Drawing Sheets

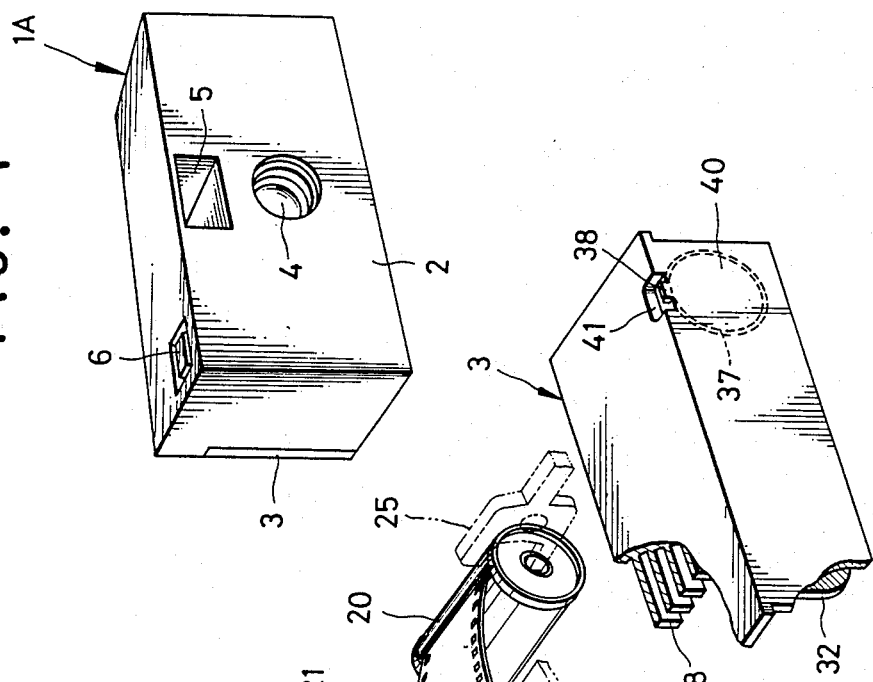
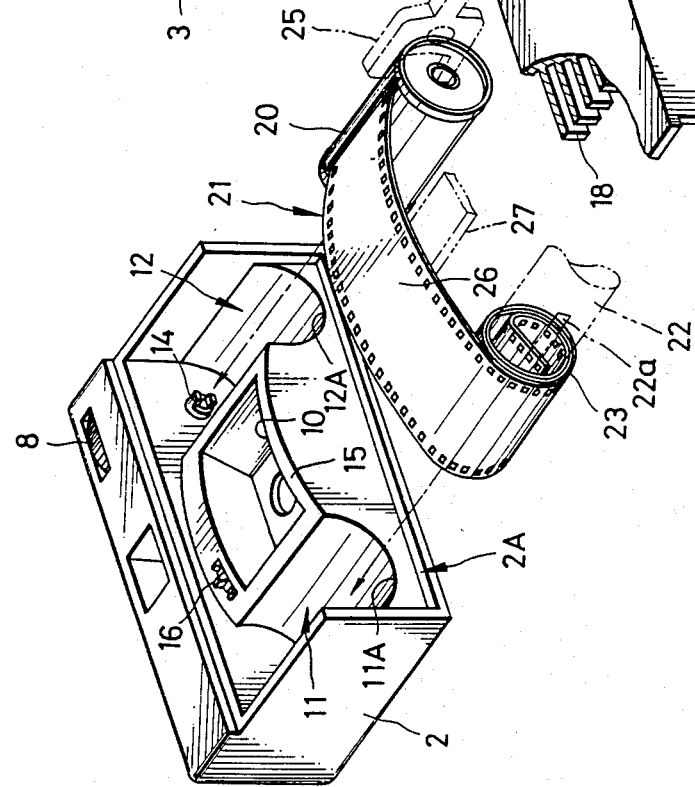

LENS-FITTED PHOTOGRAPHIC FILM PACKAGE

BACKGROUND OF THE INVENTION

The present invention relates to a lens-fitted photographic film package, and more particularly to a lens-fitted photographic film package in which a photographic film, a taking lens and exposure elements with their associated structure are incorporated in a light-tight film case as an integral whole.

Lens-fitted photographic film packages provide many chances to enjoy oneself by conveniently taking pictures even when one has no camera. Such lens-fitted photographic film packages comprise, as an integral whole, a film case provided with a taking lens; simple mechanisms which include a film winding mechanism and an exposure mechanism with their associated structure incorporated in the film case; and a 110-size film cartridge or a film contained in a 35 mm-size film patrone pre-packaged in the film case, which can be sold wherever photographic film is sold. Such a lens-fitted photographic film package not only can be sold at a considerably low cost because there need be no provision of a film loading back cover, a film rewinding mechanism, a complicated exposure control mechanism and so forth that are provided in conventional cameras, but also provides photographers with convenience and fun when taking pictures because there is no need to load and unload a film.

Such a lens-fitted photographic film package, after the exposure of all frames of the film, is forwarded to a photo shop or photo laboratory without removing the film. There, the exposed film in the film cartridge is removed by rupturing the film package and then developed to make prints therefrom, while the film package without film is scrapped. The prints together with the developed film are returned to the customer.

However, it is difficult to make enlarged prints with a favorable image quality from 110-size film. For better image quality, it has been proposed to provide a lens-fitted film package including a 135-size roll film whose image size is 36×24 mm, which is the most popular for amateur photography. By incorporating a 135-size roll film in a film patrone defined by the International Standardization Organization (ISO code 1007: 1979 edition) in such a lens-fitted film package, the existing film processing systems can be utilized in their entireties for the lens-fitted film packages. In this case, a 135-size roll of film is withdrawn and rolled with its one end attached to a spool of the film patrone before being incorporated in the film package. In the film package, the rolled film and a patrone are housed in a film casing. Upon taking pictures, the rolled film is drawn into the film patrone one frame each exposure. When all the frames are exposed, the exposed rolled film is entirely within the patrone, which makes it possible to take the film patrone out of the film package in a daylight room without any film rewinding operation.

The most important requirement associated with such a lens-fitted film package using a 135-size film is to hold the film accurately in the exposure position. However, because the film package tends to deform upon the application of external force, it is a bit difficult to maintain the film flat in the focal plane. For avoiding the influence of external force on the film in the film package, a pressure plate similar to those provided in conventional cameras can be incorporated in order to hold the film accurately in the exposure position. However, from the standpoint of low manufacturing cost of such a lens-fitted film package, the provision of a pressure plate is not advantageous.

OBJECTS OF THE INVENTION

It is, therefore, an object of the present invention to provide a lens-fitted photographic film package which makes it possible to remove easily an exposed film therefrom.

It is another object of the present invention to provide a lens-fitted photographic film package suitable for only a single use.

SUMMARY OF THE INVENTION

To accomplish the above and other objects, the lens-fitted photographic film package according to the present invention is provided with a reinforcing means formed on inner walls of a film case of the film package to prevent the film case from being deformed by external force applied thereto.

According to a feature of a preferred embodiment of the present invention, reinforcing ribs are provided on an inner side of a back wall of the film case of the film package. In this case, the reinforcing ribs extend in the direction of advance of the film and serve as reinforcing means not only to avoid deformation of the film but also to support accurately the film in the correct exposure position.

According to a feature of another preferred embodiment of the present invention, the reinforcing member is in the form of a tongue-like platform by which two sections of the film cases are connected. By the provision of the platform member, the two sections are accurately positioned with respect to each other upon assembly.

BRIEF DESCRIPTION OF THE DRAWINGS

The above and other objects and features of the present invention will become apparent from the following detailed description taken in conjunction with preferred embodiments thereof with reference to the accompanying drawings in which like parts are designated by like numerals throughout the views of the drawings and wherein:

FIG. 1 is a perspective view of the lens-fitted photographic film package of one embodiment of the present invention;

FIG. 2 is an exploded perspective view of the lens-fitted photographic film package of FIG. 1;

DETAILED DESCRIPTION OF THE INVENTION

Figure 3:
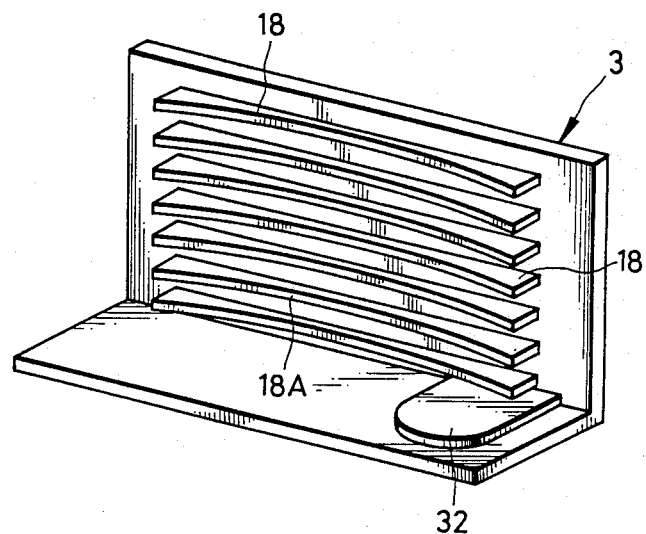
FIG. 3 is a perspective view of the rear case section of the lens-fitted film package of FIG. 1.

The lens-fitted photographic film package according to preferred embodiments of the present invention incorporates several elements, in particular exposure elements and film advancing elements, similar to those of simple still picture cameras. Because such elements are well known to those skilled in the art, this description will be directed in particular to elements forming part of, or cooperating directly with the lens-fitted photographic film package embodying the present invention. It is to be noted that, although the description will be directed to lens-fitted photographic film packages incorporating a 35 mm-size film patrone, the film container may take any of various forms well known to those skilled in the art and already commercially available. It is to be noted that the lens-fitted photographic film package may be provided with a film winding and rewinding mechanism by which a film contained in a film patrone is advanced by one frame every exposure and, when the exposure of all frames of the film is completed, the exposed film is rewound in the film container.

Referring now to FIG. 1, shown therein is a lens-fitted photographic film package (which is hereinafter referred to as a film package for simplicity) 1A of a preferred embodiment of the present invention. The film package 1A comprises a front case section 2 made of plastic and a rear case section 3 which are assembled into an integral body to form a light-tight rectangular box-shaped film case. The front case section 2 is provided with a taking lens 4, a viewfinder window 5, and a shutter actuating member 6, in its outer walls. Inside the front case section 2, necessary photographic mechanisms such as a shutter mechanism, film advancing mechanism and the like are provided. The rear case section 3 is fixed to the front case section 2 in any well known manner, for example by means of ultrasonic welding, so as not to be separable by users. The film package 1A is preferably encased tightly in an outer cover (not shown) in which are formed several openings for exposing the taking lens 4, viewfinder window 5, and shutter actuating member 6.

FIG. 2 shows the film package 1A disassembled into two sections, namely the front case section 2 having an opening 2a extending across its rear and bottom and the rear case section 3 shaped complementarily to close the opening 2a of the front case section 2. Inside the front case section 2, there are a film roll receiving chamber 11 and a film patrone receiving chamber 12 disposed on opposite sides of an exposure frame 10. As is apparent from FIG. 2, the chambers 11 and 12 open rearwardly and each has a rear portion of semicircular cross section. Projecting from the top wall of the film patrone receiving chamber 12 is a fork 14 which is rotated by a film advancing knob 8 and is rotatable in the clockwise direction as viewed in FIG. 2. The exposure frame 10 is formed with film guiding and supporting tracks 15 gently curved rearwardly convex on the upper and lower side thereof. In one of the tracks 15, there is a sprocket wheel 16 partially projecting from the surface of the track 15.

On the inner surface of the back wall of the rear case section 3, there is provided a plurality of reinforcing ribs 18 formed integrally with the back wall as is shown in detail in FIG. 3. The reinforcing ribs 18 extend lengthwise over the back wall, preventing the rear case from being deformed by an external force. Each reinforcing rib 18 has a gently concavely curved front surface 18a shaped complementarily to the shape of the curved film guiding and supporting tracks 15. The reinforcing ribs 18, when the rear case section 3 is attached to the front case section 2, gently press the film 26 extending between the film roll 23 and the film patrone 20 against the supporting tracks 15 and finally hold the film 26 in cooperation with the supporting tracks 15. In this way, the film 26 is held stably in the exposure position without shifting vertically and/or waving over the exposure frame 10.

On the inside surface of the bottom wall of the rear case section 3, there is a platform 32 formed integrally with the rear case section 3 which supports lower edges of the convolutions of the rolled film 23 so as to keep the film roll upright.

On the outer surface of the bottom wall of the rear case section 3, there is formed a pull-tab 38 and a recess 41 in which the pull-tab 38 is received. On the other hand, in the inner surface of the bottom wall of the rear case section 3, there is formed a circular groove 37 having a V-shaped cross section by which an openable pat 40 is defined in the rear case section 3. The circular groove 37 has a diameter larger than that of the patrone 20. The circular groove 37 allows the openable part 40 to be broken or torn off when the pull-tab 38 is pulled so as to form an opening through which the patrone 20 can be axially removed without any necessity of detaching the rear case section 3 from the front case section 2.

Upon assembling the film package 1A, a roll of, for example in this embodiment, 135-size film 21 and the film patrone 20 which is empty but retains one end of the film 21 attached to a spool 28 of the film patrone 20 are put in the chambers 11, 12, respectively, prior to assembling and fixing the two case sections 2 and 3 together. This film 21 is of the type having 35 mm image frames, which is defined as 135 film by ISO-1007: 1979 edition (International Standardization Organization).

The above-described film-loading operation, in this embodiment, is performed with the aid of a film loading jig which is schematically shown by a double dotted line in FIG. 2. In greater detail, the unexposed film 21 withdrawn from the film patrone 20 is wound around a cylindrical spool member 22 of the loading jig as a film roll 23 in many convolutions. The film patrone 20 is held by a gripping am 25 of the loading jig and a portion 26 of the film extending between the film roll 23 and the film patrone 20 is supported by a plate member 27 of the loading jig in such a way to be slightly raised and curved.

The film patrone 20 and the film 21 held by the loading jig can be inserted into the respective receiving chambers 11 and 12 through respective bottom openings 11A and 12A by moving the loading jig toward the front case section 2 until the top of the spool 28 of the film patrone 20 is brought into engagement with the fork 14. During this film loading operation, since the portion 26 of the film 21 is raised and curved, the forward edge of the portion 26 of the film 21 will not be caught by the teeth of the sprocket wheel 16.

After having loaded the film roll 23 and the film patrone 20 in the front case section 2 and in the above-described manner, the gripping arm 25 unclamps the patrone 20 and the cylindrical spool member 22 is resiliently deformed to release the film 21. The deformation of the cylindrical spool member 22 is made possible by the provision of a slot 22a by which one end of the film 21 is nipped. Then the loading jig is retracted, leaving the film roll 23 and the film patrone 20 in the respective receiving chambers 11 and 12. Although the rolled film 23 is apt to loosen due to its own resilience, the outermost convolution of the rolled film 23 is restricted by the wall having a semicircular cross section of the film roll receiving chamber 11 to prevent the film roll 23 from loosening excessively. Then the rear case section 3 is attached and welded to the front case section 2.

Figure 4:
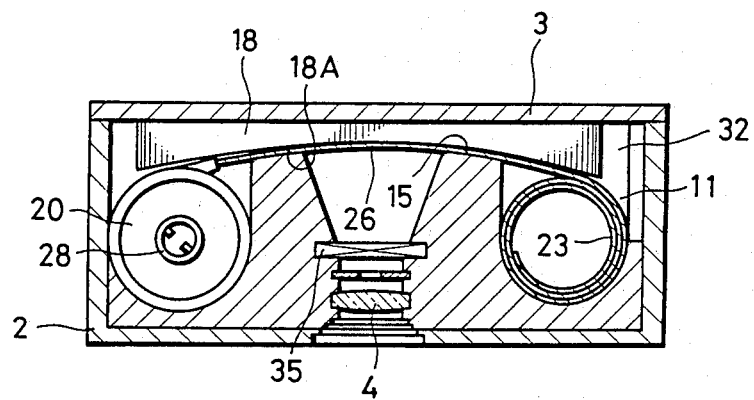
FIG. 4 is a cross sectional view of the lens-fitted photographic film package of FIG. 1.

As was previously described, the rear case section 3 is provided with reinforcing ribs 18 shaped complementarily to the shape of the supporting tracks 15 of the exposure frame 10 for pressing the portion 26 of the film 21 against the supporting tracks 15 so as to place and hold it in the focal plane of the taking lens 4. From the point of view of manufacturing cost and retail price, it is preferable to use a plastic single lens for the taking lens 4. Although the plastic single lens produces some distortion, the curved supporting tracks 15 and the curved reinforcing ribs 18 help to reduce this distortion. As can be seen in FIG. 4, since the curved ribs 18 support the film roll 23 in the chamber 11 from the rear, the film roll 23 is not substantially deformed from its cylindrical shape.

The film loading and film package assembling must be done in a darkroom. The film package 1A of this invention can be assembled automatically with the aid of a manipulator in cooperation with the above-described loading jig even in a darkroom because of the structural simplicity thereof. Therefore, the film package 1A can be assembled at very low cost.

Alternatively, the film patrone 20 and the film roll 23 may be loaded in such a way as to wind the film 21 around the cylindrical spool member 22 of the loading jig after the loading of the film patrone in the patrone-receiving chamber 12. In this case, the film 21 is wound while being raised at an angle between 30° and 45° with respect to the film roll receiving chamber 11. After the film 21 has been fully wound around the cylindrical spool member 22, the rolled film 23 is placed in the film roll receiving chamber 11 and then the cylindrical spool member 22 is removed.

In the use of the film package 1A thus assembled, when the shutter actuating member 6 is operated, a shutter 35 is opened and closed for a time such as to make a proper exposure of a frame of the film 21 in the exposure position. After the exposure, the film advancing knob 8 is operated to rotate the fork 14, thereby directly rotating the spool 28 of the patrone 20 so as to wind the film by one frame, thereby to take up the exposed part of the film in the patrone 20. On the other hand, another frame of the film 21 is forwarded to the exposure frame 10. The advancing film rotates the sprocket 16; and when the sprocket 16 makes a predetermined number of revolutions, the film advancing knob 8 and the shutter 35 with its associated elements are self-cocked so as to ready the film package 1A for another exposure.

As the exposure operation is repeated in the same manner as described above, the film 21 is taken up in the patrone 20 frame by frame. After the exposure of all the frames of the film 21, the film 21 is fully wound up in the patrone 20. Then the film package 1A is forwarded to a photo shop without removing the exposed film. There, the patrone 20 is removed from the film package 1A. For this removal of the patrone 20, the pull-tab 38 is pulled either by hand or by use of a pulling tool to break or tear off the openable part 40 of the bottom wall of the rear case section 3 along the circular groove 37. As a result, an opening is formed in the bottom wall of the rear case section 3. As was previously described, since this opening has a diameter larger than that of the patrone 20, the opening allows the patrone 20 to be easily taken out axially. After the removal of the patrone 20 containing an exposed film, the film package 1A is incapable of being reused because of this opening. The patrone 20 is handled in the same manner as conventional patrones to remove the exposed film; then the exposed film is subjected to necessary processing for development and printing.

Figure 5:
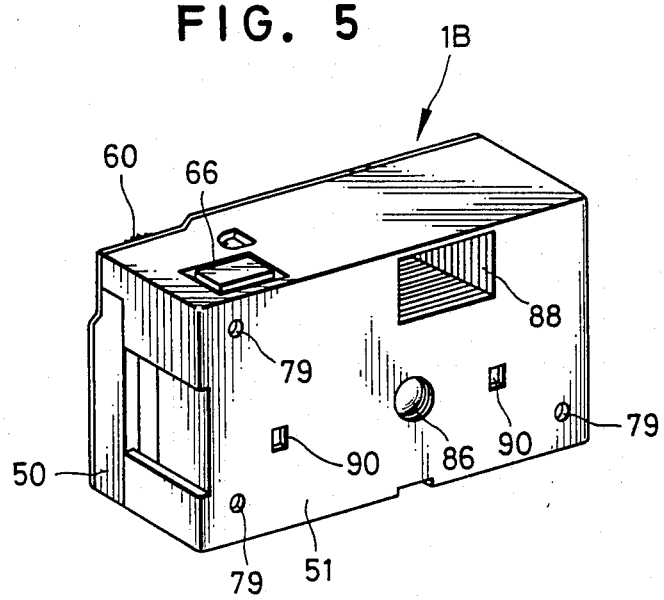
FIG. 5 is a schematic perspective view of the lens-fitted photographic film package of another preferred embodiment of the present invention.
Figure 7:
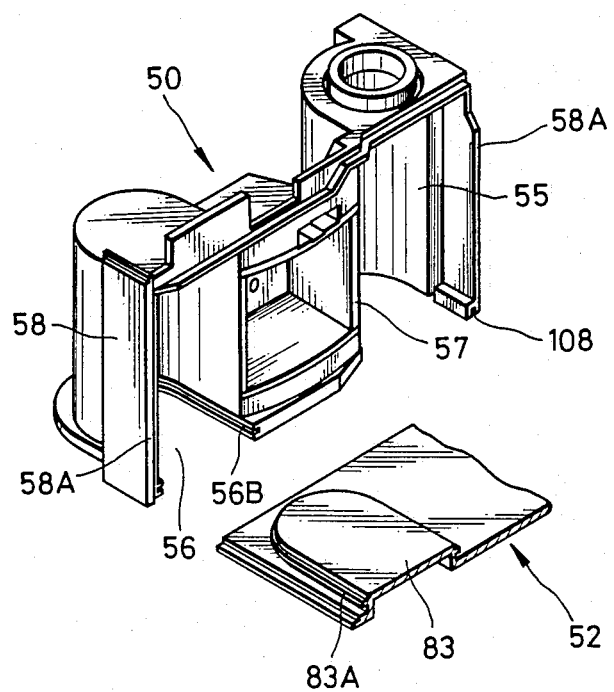
FIG. 7 is a perspective view of the middle section of the lens-fitted film package of FIG. 5.
Figure 6:
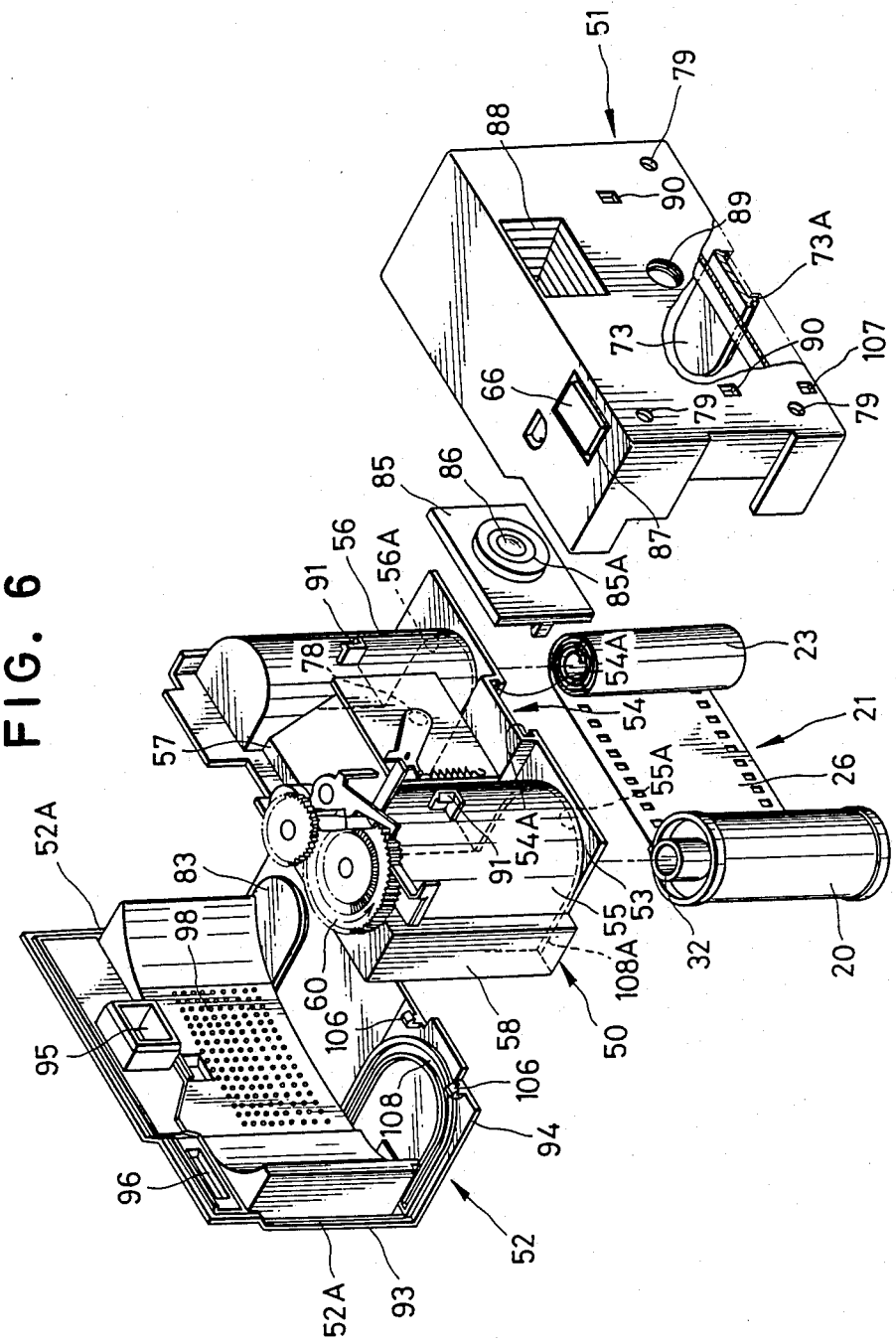
FIG. 6 is an exploded perspective view of the lens-fitted photographic film package of FIG. 5.

Reference is now had to FIGS. 5 to 7 showing another preferred embodiment of the film package 1B. The lens-fitted film package 1B comprises a case body or middle case section 50, a front cover or front case section 51, and a rear cover or rear case section 52 which are all made of plastic. These sections 50, 51 and 52 are assembled into an integral light-tight box-shaped film case. As will be described in detail later, these sections 50, 51 and 52 are fixedly assembled after having loaded an empty film patrone 20 and a film 21 in the middle case section 50. Therefore, the film patrone 20 and the film 21 cannot be separated by the user.

As is shown in FIG. 6, on a base plate 53 of the middle case section 50, there are formed a patrone-receiving chamber 55 and a film roll receiving chamber 56 spaced apart a predetermined distance from each other. Each chamber 55, 56 is open at its bottom through an opening 55A, 56A through which the patrone 20 or the film 21 is inserted. Upon loading film, the film 21 is withdrawn from the film patrone 20 which is well known to those skilled in the art and already commercially available, and the withdrawn part of the film forms a film roll 23. Then the empty film patrone 20 and the film roll 23 are loaded in the middle case section 50 through the openings 55A and 56A. This loading operation is performed in a darkroom. It is to be noted that the film 21 may be withdrawn from the film patrone 20 after the loading of the film patrone 20 in the middle case section 50.

Between the first patrone-receiving and film roll receiving chambers 55 and 56, there is a connecting section 57 in which an exposure frame is formed. All the three sections 55, 56, and 57 are integral with a generally U-shaped frame 58. At the middle of the base plate 53, there is formed a wide groove 54 with generally U-shaped guide slots 54A on opposite sides thereof. These guide slot 54A are slidably engaged by peripheral rails 73A formed on a tongue-like platform member 73 on opposite sides thereof, which will be described in detail later. As is shown in FIG. 6, between the middle case section 50 and the front case section 51, there is a lens supporting board 85 in which an opening 85A is formed to hold a plastic lens 86 as the taking lens. The lens supporting board 85 is so placed as to align the plastic lens 86 with an exposure aperture 78 formed in the exposure frame.

Formed in the top wall of the front case section 51 is a square opening 87 which receives therein a shutter actuating member 66 with its top surface flush with, or even below, the outer surface of the top wall of the front case section 51. In the front wall of the front case section 51, there are a tunnel-like viewfinder 88, a circular opening 89, and small square openings 90 and 107. The opening 89 is formed coaxially with the optical axis of the lens 86. The small openings 90 are so located as to receive hooked lugs 91 projecting from the middle case section 50 by which the two sections 50 and 51 are temporarily secured together. At the bottom of the front case section 51 there is formed the rearwardly projecting platform member 73 having the peripheral rails 73A on opposite sides thereof which is inserted into the groove 54 formed in the middle case section 53 when the film case is assembled. Owing to the provision of the platform member 73 and the bottom groove 54A, the film package 1B is constructionally reinforced so as to avoid deformation by an external force.

The rear case section 52 which has a generally L-shaped configuration comprises a back wall 93 and a bottom wall 94. In the back wall 93 there is an opening 95 in alignment with the tunnel-like viewfinder 88 through which an object is viewed. There is also formed in the back wall 93 of the rear case section 52 a rectangular opening 96 in the back wall 93 which receives therein a film advancing knob 60 with its outer periphery flush with, or even below, the outer surface of the back wall 93 of the rear case section 52. Inside the back wall 93 of the rear case section 52 is a portion 98 having a curved surface for supporting the film 21 thereon and guiding it therealong.

The bottom wall 94 of the rear case section 52 is so formed as to cover the bottom openings 55A and 56A of the film patrone-receiving chamber 55 and the film roll receiving chamber 56 when the rear case section 52 is fitted to the middle case section 50. For this closing of the bottom opening 56A, as is shown in detail in FIG. 7, there is a tongue-like platform member 83 whose edge has a peripheral projection 83A which in turn is engageable with an inner groove 56B in middle case section 50. This platform member 83 closes the bottom opening 56A by inserting the peripheral projection 83A into the circumferential inner groove 56B when assembling the film case. This engagement between the tongue-like member and the bottom opening is advantageous to maintain the inside of the film roll receiving chamber 56 light-tight; to reinforce the film case so as not to deform easily by an external force applied thereto; and to position accurately the platform member 83 in the bottom opening 56A.

In the bottom wall 94 there is also formed a groove 108 which receives a semi-circular rail 108A formed on a lower end surrounding the bottom opening 55A of the patrone-receiving chamber 55 to form a labyrinth seal when the photographic film package 1B is assembled as is shown in FIG. 5. Owing to this labyrinth seal, the inside of the film patrone-receiving chamber 55 is maintained light-tight. At a front edge, the bottom wall 94 is provided with a pair of the hooked lugs 106 upwardly projecting therefrom which are brought into engagement with a small square recess 107 formed in the front wall of the front case section 51 when the photographic film package 1B is assembled.

The rear case section 52 is formed with groove 52A surrounding its outer periphery into which are fitted rails 58A formed on rear surfaces at both side of the frame member 58 of the middle case section 50 and on rear transverse end surfaces of the front case section 51 to form a labyrinth seal when the photographic film package 1B is assembled. Owing to this labyrinth seal, the inside of the photographic film package 1B can be maintained light-tight. Therefore, the film 21 received in the middle case section 50 can be contained light-tightly when the middle, front and rear case sections 50 to 52 are secured together.

When assembling the film package 1B, the front case section 51 is first positioned front side down by fitting positioning pins (not shown) of an assembling apparatus into the holes 79 and then the middle section 50 is placed on the front section 51 to insert the platform member 73 into the groove 54. Thereafter, the rear case section 52 is fitted to the middle case section 50 in such a way as to place the bottom wall 94 below the base plate 53 of the middle case section 50 so as to cover the openings 55A and 56A of the film patrone and film roll receiving chambers 55 and 56. At this time, the respective vertical grooves 52A of the rear case section 52 and the semi-circular groove 108 of the bottom wall 94 receive the corresponding rails of the middle case section 50. Due to the construction of the film package 1B, by fixing the rear case section 52 to the middle case section 50 in which the film patrone 20 and the film roll 23 have been previously loaded, the film 21 is contained light-tightly. Thereafter, the fixing of the front case section 51 is effected by inserting the platform member 73 of the front case section 51 into the bottom groove 54 of the middle case section 50; fitting the rear edge of the front case section 51 into the transverse groove 52A of the rear case section 52; and then engaging the hooked lugs 91 of the middle case section 50 and the hooked lug 106 of the bottom wall 94 of the rear case section 52 with the small square openings 90 and 107 formed in the front wall of the front case section 51, respectively. After this fitting, the rear case section 52 is pressed down to engage the hooked lugs 91 with the margins of the openings 90 of the front case section 51, whereby the middle case section 50 is fixedly attached to the front case section 51. Then the semi-assembled film case is placed in a darkroom to load the film roll 23 and the film spool 20 therein. Thereafter, the rear case section 52 is fixedly attached to the middle case section 52 by fitting the vertical rails 58A in the right side and left side vertical grooves 52A of the rear case section 52. By pressing the rear case section 52 against the middle case section 50, the hooked lugs 106 are brought into engagement with the margins of the holes 107 of the front case section 51; and thus the complete light-tight film case is assembled.

The film package 1B shown in FIGS. 5 to 7 is used in the same manner as the previously described embodiment.

It is particularly to be noted that, in the film package thus constructed, the platform members 73 and 83 serve not only as reinforcing means to prevent the film package from being deformed by an external force but also as positioning means to position the front and rear case sections with respect to the middle section upon assembling.

As best seen in FIG. 6, at either end of the portion 98 of rear case section 52 there are concave portions that face forward and overlie and rearwardly close the chambers 55 and 56 and, in the case of film roll chamber 56, maintain the film roll in its cylindrical configuration, as described above in connection with chamber 11.

Although the present invention has been fully described by way of the preferred embodiments thereof with reference to the accompanying drawings, various possible changes and modifications will be apparent to those skilled in the art. Therefore, unless otherwise such changes and modifications depart from the scope of the present invention, they should be construed as included therein.

What is claimed is:

1. A lens-fitted photographic film package comprising a light-tight film case with a taking lens fitted thereto, an empty film container enclosed in said light-tight film case, and a rolled film with its one end retained in said empty film container which is enclosed in said light-tight film case, said light-tight film case having a back wall whose rear side is an outer side of said package, said back wall having a plurality of ribs integral with said back wall and extending in a direction along which a film is withdrawn from said film roll into said film container, said ribs having forward edges that are concave as seen in the edgewise direction of the film, said ribs contacting and supporting and guiding said film from the back of said film, there being a plurality of said ribs spaced from the longitudinal edges of the film and in contact with portions of the film that are spaced from said longitudinal edges of the film.

2. A lens-fitted photographic film package as defined in claim 1, wherein said light-tight film case is made of plastic.

3. A lens-fitted photographic film package as defined in claim 2, wherein said light-tight film case consists of front and rear case sections.

4. A lens-fitted photographic film package as defined in claim 3, wherein said ribs are molded on said rear case section.

5. A lens-fitted photographic film package as defined in claim 2, wherein said light-tight film case consists of front, middle and rear case sections.

6. A lens-fitted photographic film package as defined in claim 5, wherein said ribs are molded on said rear case section.

7. A lens-fitted photographic film package as defined in claim 1, wherein said film container is a film patrone defined by ISO-1007 (International Standardization Organization-1007: 1979 edition).

8. A lens-fitted photographic film package comprising a light-tight film case with a taking lens fitted thereto, an empty film container enclosed in said light-tight film case, and a rolled film with its one end retained in said light-tight film case, said light-tight film case comprising an open-sided case body section and a cover section for closing said open side of said case body section, one of said sections being formed with a platform member fitted in a groove formed in the other said section, said case body section having a pair of rearwardly opening film receiving chambers therein, said groove bordering one end of one of said chambers.

9. A lens-fitted photographic film package as defined in claim 8, wherein said platform member and groove are formed at the bottoms of said case body and cover section, respectively.

10. A lens-fitted photographic film package as defined in claim 8, wherein said cover section is a front cover member.

11. A lens-fitted photographic film package as defined in claim 8, wherein said cover section is a rear cover member.

12. A lens-fitted photographic film package as defined in claim 11, wherein said platform member is fitted in a bottom opening of said one film receiving chamber.

13. A lens-fitted photographic film package as defined in claim 8, said cover section having a rear side which is an outer side of said package, said cover section having a plurality of ribs integral with said cover section and disposed on the forward side of said cover section and extending in a direction along which a film is withdrawn from said rolled film into said film container, said ribs having forward edges that are concave as seen in the edgewise direction of the film, said ribs contacting and supporting and guiding said film from the back of said film.

14. A lens-fitted photographic film package comprising a light-tight film case with a taking lens fitted thereto and a rolled film, said case having a rolled film chamber, a film take-up chamber, and a back wall portion that closes said two chambers, said rolled film chamber having a rearwardly opening concave curved wall against which the outermost turn of the rolled film lies, said back wall portion having protuberances thereon that define a forwardly opening concave path for the film between said chambers, said back wall portion having a forwardly opening concave curved portion that overlies said rolled film chamber and that contacts and supports the rear of the film emerging from said roll at regions of said film spaced from the longitudinal edges of the film and that in cooperation with said rearwardly opening concave wall of said rolled film chamber contacts the outermost turn of said rolled film and maintains said rolled film in a substantially cylindrical roll.

15. A lens-fitted photographic film package comprising a light-tight film case with a taking lens fitted thereto and a rolled film, said case having a rolled film chamber, a film take-up chamber, and a back wall portion that closes said two chambers, said rolled film chamber having a rearwardly opening concave curved wall against which the outermost turn of the rolled film lies, said back wall portion having a forwardly opening concave curved portion that overlies said rolled film chamber and that contacts and supports the rear of the film emerging from said roll at regions of said film spaced from the longitudinal edges of the film and that in cooperation with said rearwardly opening concave wall of said rolled film chamber contacts the outermost turn of said rolled film and maintains said rolled film is a substantially cylindrical roll.

16. A lens-fitted photographic film package as defined in claim 15, said back wall portion having a weakened part which overlies only said film take-up chamber and which is adapted to be broken open and which when broken open both destroys the case and permits removal of the film from said film take-up chamber.

17. A lens-fitted photographic film package as defined in claim 16, in which said back wall portion includes a bottom part that closes the bottom of said chambers, said weakened part being disposed in said bottom part.

* * * * *